(12) United States Patent
Stewart et al.

(10) Patent No.: US 7,051,109 B1
(45) Date of Patent: May 23, 2006

(54) METHODS AND APPARATUS FOR USING SCTP TO PROVIDE MOBILITY OF A NETWORK DEVICE

(75) Inventors: Randall R. Stewart, Crystal Lake, IL (US); Peter P. Lei, Arlington Heights, IL (US)

(73) Assignee: Cisco Technology, Inc., San Jose, CA (US)

( * ) Notice: Subject to any disclaimer, the term of this patent is extended or adjusted under 35 U.S.C. 154(b) by 720 days.

(21) Appl. No.: 10/008,091

(22) Filed: Nov. 9, 2001

Related U.S. Application Data

(60) Provisional application No. 60/271,218, filed on Feb. 21, 2001.

(51) Int. Cl.
*G06F 15/16* (2006.01)
*G06F 15/177* (2006.01)
*H04J 3/16* (2006.01)

(52) U.S. Cl. .................. 709/230; 709/228; 709/220; 370/466; 370/467

(58) Field of Classification Search ........ 709/217–222, 709/226–228, 231, 238, 239, 242, 246, 230; 370/466, 467, 469
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 6,374,108 B1* | 4/2002 | Jakobsen et al. | 455/432.1 |
| 6,515,985 B1* | 2/2003 | Shmulevich et al. | 370/356 |
| 6,771,623 B1* | 8/2004 | Ton | 370/331 |
| 6,826,198 B1* | 11/2004 | Turina et al. | 370/467 |

OTHER PUBLICATIONS

Release notes for 3Com Corporation, "*Conducting a Redundant Route for Network Resiliency*," Mar. 1994, *NET Builder Family Bridge/Router* pp. 26-29.
Uyless Black, "*TCP/IP and Related Protocols*," 1992, *McGraw-Hill, Inc.*, pp. 226-249.
T. Li, et al., RFC 2281 "*Cisco Hot Standby Router Protocol (HSRP)*," Mar. 1998.

(Continued)

*Primary Examiner*—Patrice Winder
*Assistant Examiner*—El Hadji M. Sall
(74) *Attorney, Agent, or Firm*—Beyer Weaver & Thomas LLP

(57) ABSTRACT

Methods and apparatus for supporting mobility using SCTP are disclosed. In accordance with one aspect of the invention, an SCTP association between a first network device and a second network device may be modified. The SCTP association includes a first set of IP addresses associated with the first network device and a second set of IP addresses associated with the second network device. The first network device establishes the SCTP association between the first network device and the second network device. An SCTP configuration message is then sent from the first network device to the second network device, the configuration message indicating a modification to be made to the SCTP association, thereby enabling the SCTP association to be modified without disconnecting an existing session.

52 Claims, 9 Drawing Sheets

OTHER PUBLICATIONS

Chambless, et al., "*Home Agent Redundancy Protocol (HARP),*" Oct. 27, 1997.
C. Perkins, "*IP Mobility Support,*" RFC2002, IBM Corporation, Oct. 1996.
"*Mobile IP,*" Release 12.0(1)T, pp. 1-55.
Montenegro, G., "*Reverse Tunneling for Mobile IP,*" RFC 2344, Sun Microsystems, Inc., pp. 1-19, May 1998.
D. Harkins and D. Carrel, "*The Internet Key Exchange (IKE),*" Cisco Systems, pp. 1-33, Jun. 1998.
D. Cong and M. Hamlen, and C. Perkins, "*The Definitions of Managed Objects for IP Mobility Support using SMIv2,*" RFC2006, Motorola and IBM, pp. 1-52, Oct. 1996.
Aboba and Beadles, "*The Network Access Identifier*" RFC 2486, Jan. 1999.
Calhoun and Perkins, "*Mobile IP Network Access Identifier Extension*", Jan. 12, 2000.
Postel, J., "*Simple Mail Transfer Protocol*", STD 10, RFC821, Aug. 1982.
Crocker, D. and P. Overrell, "*Augmented BNF For Syntax Specifications:ABNF*", RFC 2234, Nov. 1997.
Stewart et al., "Stream Control Transmission Protocol", RFC 2960, Oct. 2000, 124 pages.

\* cited by examiner

SCTP Common
Header Format

METHODS AND APPARATUS FOR USING SCTP TO PROVIDE MOBILITY OF A NETWORK DEVICE

CROSS REFERENCE TO RELATED APPLICATIONS

This application claims priority of provisional U.S. patent application Ser. No. 60/271,218, filed Feb. 21, 2001, entitled "Using SCTP to Provide a Layer 4 IP Mobility," which is incorporated by reference.

BACKGROUND OF THE INVENTION

1. Field of the Invention

The present invention relates to Mobile IP network technology. More particularly, the present invention relates to methods and apparatus for using Stream Control Transmission Protocol (SCTP) to provide a layer 4 IP mobility.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the IP Routing for Wireless/Mobile Hosts Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various agent solicitations and agent advertisements which form part of the Mobile IP protocol. When Mobile Node 6 engages with network segment 14, it composes a registration request for the Home Agent 8 to bind the Mobile Node's current location with its home location. Foreign Agent 10 then relays the registration request to Home Agent 8 (as indicated by the dotted line "Registration"). During the registration process, the Home Agent and the Mobile Node 6 may then negotiate the conditions of the Mobile Node's attachment to Foreign Agent 10. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of address (e.g., a collocated care-of address or the Foreign Agent's IP address) to the identity (e.g., home address) of Mobile Node 6. Further, if the Mobile Node 6 registered via a Foreign Agent, the Foreign Agent 10 updates an internal "visitor table" which specifies the Mobile Node address, Home Agent address, etc. In effect, the Mobile Node's home base IP address (associated with segment 12) has been binded to the care-of address such as the Foreign Agent's IP address (associated with segment 14).

Now, suppose that Mobile Node 6 wishes to send a message to a Correspondent Node 18 from its new location. An output message from the Mobile Node is then packetized and forwarded through Foreign Agent 10 over the internet 4 to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

Although Mobile IP is in widespread use, there are various disadvantages associated with the Mobile IP protocol. For instance, once a Mobile IP session is initiated after registration with a Home Agent is completed, packets must be transmitted by a Correspondent Node to the Home Agent for those packets to be received by the Mobile Node. In other words, packets must first be sent to the Home Agent in order for those packets to subsequently be forwarded to the Mobile Node. This two-step transmission process adds to the delay with which such packets would be received by the Mobile Node. In addition, such a protocol relies upon the reliability of the Home Agent and/or redundancy of Home Agents capable of receiving and forwarding such packets to the Mobile Node. In other words, if the Home Agent fails, there is a substantial probability that packets addressed to the Mobile Node will no longer be forwarded to the Mobile Node. It would therefore be desirable to establish an alternate mechanism for providing mobility within a node or network device.

Stream Control Transmission Protocol (SCTP) is viewed as a layer between the SCTP user application ("SCTP user" for short) and a connectionless packet network service such as IP. The basic service offered by SCTP is the reliable transfer of user messages between peer SCTP users. It performs this service within the context of an association between two SCTP endpoints.

SCTP is connection-oriented in nature, but the SCTP association is a broader concept than the TCP connection. SCTP provides the means for each SCTP endpoint to provide the other endpoint (during association startup) with a list of transport addresses (i.e., multiple IP addresses in combination with an SCTP port) through which that endpoint can be reached and from which it will originate SCTP packets. The association spans transfers over all of the possible source/destination combinations which may be generated from each endpoints lists. RFC 2960, "Stream Control Transmission Protocol," October 2000, authored by Stewart, et al., discloses the requirements for SCTP and specific packet formats, and is incorporated herein by reference for all purposes.

An SCTP association is a protocol relationship between SCTP endpoints, composed of the two SCTP endpoints and protocol state information including Verification Tags and the currently active set of Transmission Sequence Numbers (TSNs), etc. An association can be uniquely identified by the transport addresses used by the endpoints in the association. Two SCTP endpoints must not have more than one SCTP association between them at any given time.

An SCTP endpoint is the logical sender or receiver of SCTP packets. On a multi-homed host, an SCTP endpoint is represented to its peers as a combination of a set of eligible destination transport addresses to which SCTP packets can be sent and a set of eligible source transport addresses from which SCTP packets can be received. All transport addresses used by an SCTP endpoint must use the same port number, but can use multiple IP addresses. A transport address used by an SCTP endpoint must not be used by another SCTP endpoint. In other words, a transport address is unique to an SCTP endpoint.

An SCTP packet is the unit of data delivery across the interface between SCTP and the connectionless packet network (e.g., IP). An SCTP packet includes a common SCTP header, possible SCTP control chunks, and user data encapsulated within SCTP data chunks. FIG. 2 is a diagram illustrating an exemplary SCTP common header format. As shown, the SCTP common header typically includes a source port number 202, destination port number 204, verification tag 206, and checksum 208. The verification tag 206 is a 32 bit unsigned integer that is randomly generated. The verification tag 206 provides a key that allows a receiver to verify that the SCTP packet belongs to the current association and is not an old or stale packet from a previous association. The checksum 208 is similarly a 32 bit unsigned integer.

The SCTP packet as delivered to the lower layer consists of a common header followed by one or more chunks. Each chunk may contain either user data or SCTP control information. The SCTP user has the option to request bundling of more than one user messages into a single SCTP packet. The chunk bundling function of SCTP is responsible for assembly of the complete SCTP packet and its disassembly at the receiving end. More particularly, a chunk is a unit of information within an SCTP packet, consisting of a chunk header and chunk-specific content.

FIG. 3 is a diagram illustrating an exemplary chunk that may be transmitted in an SCTP packet. As shown, a chunk header 300 includes a chunk type 302, chunk flags 304 which are chunk specific, and a chunk length 306. The chunk further includes a chunk value 308.

A chunk value 308 may include a single value as well as multiple parameter values. FIG. 4 is a diagram illustrating an exemplary chunk value that may be transmitted as shown at block 308 of FIG. 3. More particularly, a chunk value 308 may include a parameter type 402, a parameter length 404, and a parameter value 406.

An association is initiated by a request from the SCTP user. FIG. 5 is a process flow diagram illustrating the steps performed to set up an association between a first endpoint A and a second endpoint Z. As shown at block 502, endpoint A sends an INIT message to endpoint Z including endpoint A addresses (e.g., IPA, IPH). Upon receipt of the INIT message by endpoint Z, Z sends an acknowledgement message (INIT-ACK) which includes a security cookie to endpoint Z including endpoint Z addresses at block 504. A cookie mechanism is employed during the initialization to provide protection against security attacks. Thus, as shown at block 506, endpoint A gathers endpoint Z addresses and other information from the INIT-ACK message. At block 508 endpoint A composes a COOKIE-ECHO message including the cookie received in the INIT-ACK message and sends the message to endpoint Z. Endpoint Z receives the COOKIE-ECHO message and enters the appropriate state at block 510. Endpoint Z then sends a COOKIE-ACK message to endpoint A at block 512.

At association start-up, a primary path is defined for each SCTP endpoint (e.g., endpoints A and Z), and is used for normal sending of SCTP packets. The primary path is the destination and source address that will be put into a packet outbound to the peer endpoint by default. The definition includes the source address since an implementation may wish to specify both destination and source address to better control the return path taken by reply chunks and on which interface the packet is transmitted when the data sender is multi-homed. On the receiving end, the path management is responsible for verifying the existence of a valid SCTP association to which the inbound SCTP packet belongs before passing it for further processing.

It is often desirable to add an additional network card for purposes of fault tolerance and redundancy. In addition, it may be desirable to change the IP address that is assigned to a particular interface of the network card. Unfortunately, in order to add a network card to a device or modify an IP address associated with a particular network card, it is typically necessary to disconnect a session. FIG. 6 is a process flow diagram illustrating a method of adding a network interface card to a device. As shown, after an association is set up at block 602 as described above with reference to FIG. 5, it is typically necessary to disconnect the session 604 in order to add an interface card (or otherwise modify an IP address associated with a network interface card) at block 606. As shown at block 608 when an address is added in association with a network card, it is then necessary to reconnect at block 610 so that a new association can be set up at block 612.

In view of the above, it would be desirable to modify an SCTP association without disconnecting a session. Moreover, it would be beneficial if SCTP could be used to provide mobility for a device without disconnecting an existing session.

SUMMARY OF THE INVENTION

Methods and apparatus for providing mobility using SCTP are disclosed. This is accomplished through enabling an SCTP association to be modified without disconnecting an existing session. In this manner, mobility (e.g., Ipv4, Ipv6) may be enabled within a network device such as a Mobile Node.

In accordance with one aspect of the invention, a method of modifying an SCTP association between a first network device and a second network device is disclosed. The SCTP association includes a first set of IP addresses associated with the first network device and a second set of IP addresses associated with the second network device. The first network device establishes the SCTP association between the first network device and the second network device. An SCTP configuration message is then sent from the first network device to the second network device, the configuration message indicating a modification to be made to the SCTP association, thereby enabling the SCTP association to be modified without disconnecting an existing session.

In one embodiment, the SCTP protocol is leveraged to support a configuration message. More particularly, a chunk may include one or more parameters that are used to send configuration instructions. For instance, each parameter may include a parameter type (e.g., ADD_IP_ADDRESS, REMOVE_IP_ADDRESS, SET_PRIMARY_IP_ADDRESS) that indicates that an IP address designated by a parameter value is to be added, removed and/or established as a primary IP address in the SCTP association.

In accordance with another aspect of the invention, an SCTP association between a first network device and a second network device is modified. The second network device also establishes the SCTP association between the first network device and the second network device. It then receives an SCTP configuration message indicating a modification to be made to the SCTP association, such as that described above. This enables the SCTP association to be modified without disconnecting an existing session, as will be described in further detail below.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, encapsulated frames having the format described herein and provided on appropriate media are part of this invention.

These and other features of the present invention will be described in more detail below in the detailed description of the invention and in conjunction with the following figures.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

As described above, it is typically necessary to tunnel packets to a Mobile Node via its Home Agent by addressing packets to the Mobile Node's Home Address. According to the present invention, once an association is modified, packets may be sent directly to an IP address identified in the association. In this manner, packets may be sent to a Mobile Node without requiring that packets be tunneled to its Home Agent via the Mobile Node's Home Address.

It may be desirable to modify an association (e.g., by adding an IP address to the association) when a new network interface card is added to a particular network device such as a computer or Mobile Node. In addition, rather than adding a network interface card, it may be desirable to modify an IP address associated with an interface of an existing network interface card.

Figure 1:
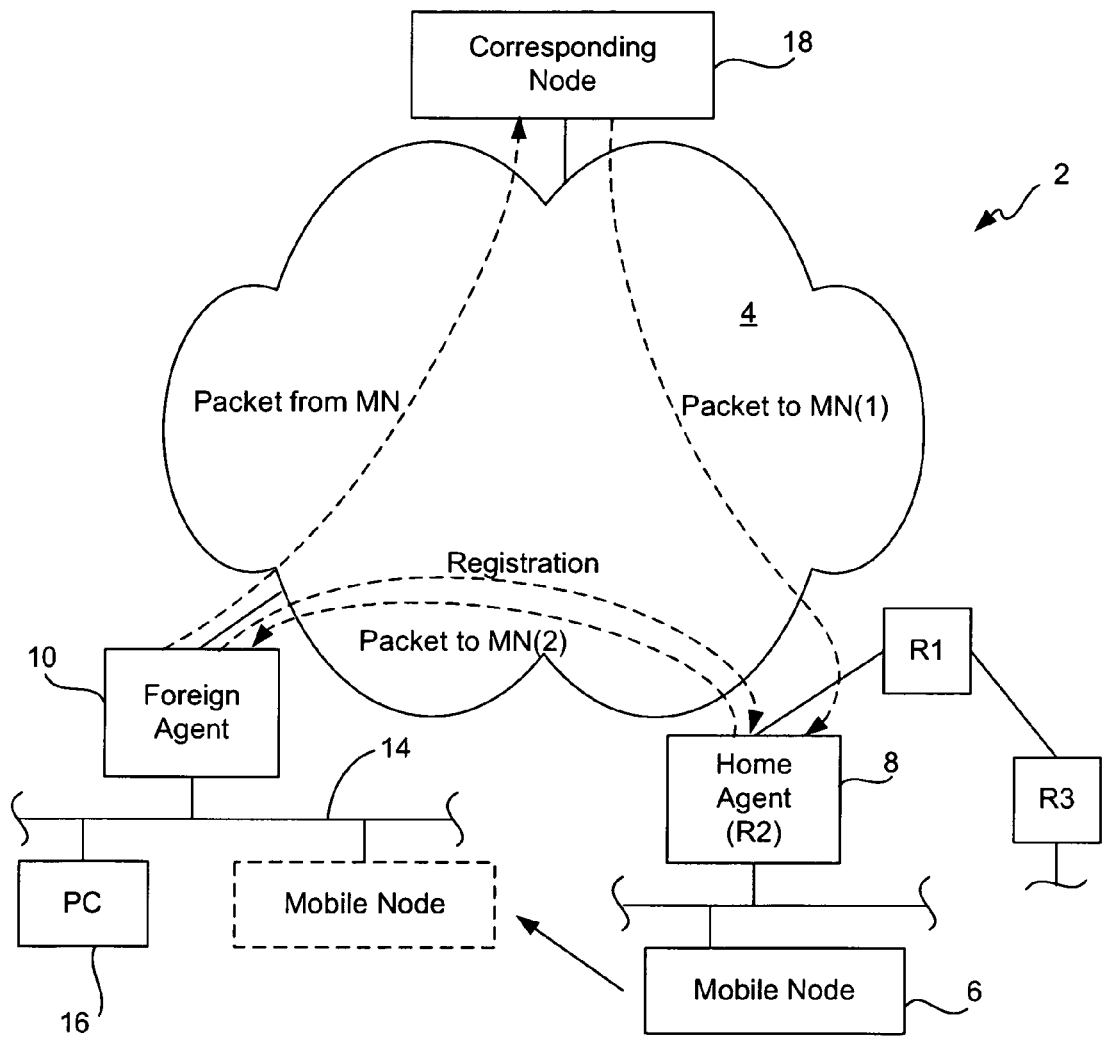
FIG. 1 is a diagram of a Mobile IP network segment and associated environment.
Figure 2:
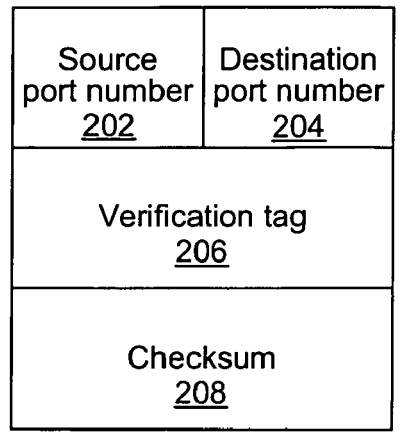
FIG. 2 is a diagram illustrating an exemplary SCTP common header format.
Figure 3:
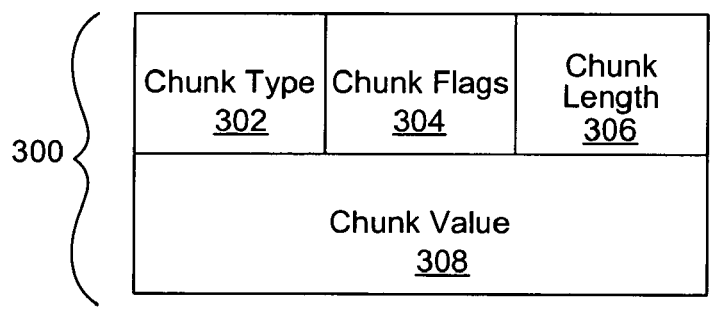
FIG. 3 is a diagram illustrating an exemplary SCTP chunk that may be transmitted in an SCTP packet.
Figure 4:
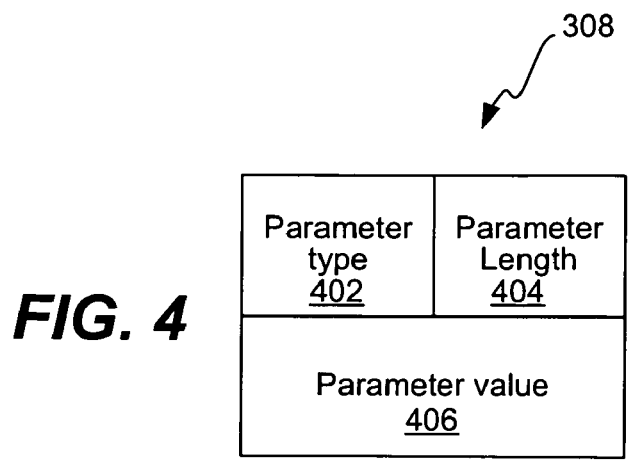
FIG. 4 is a diagram illustrating an exemplary chunk value that may be transmitted as shown at block 308 of FIG. 3.
Figure 5:
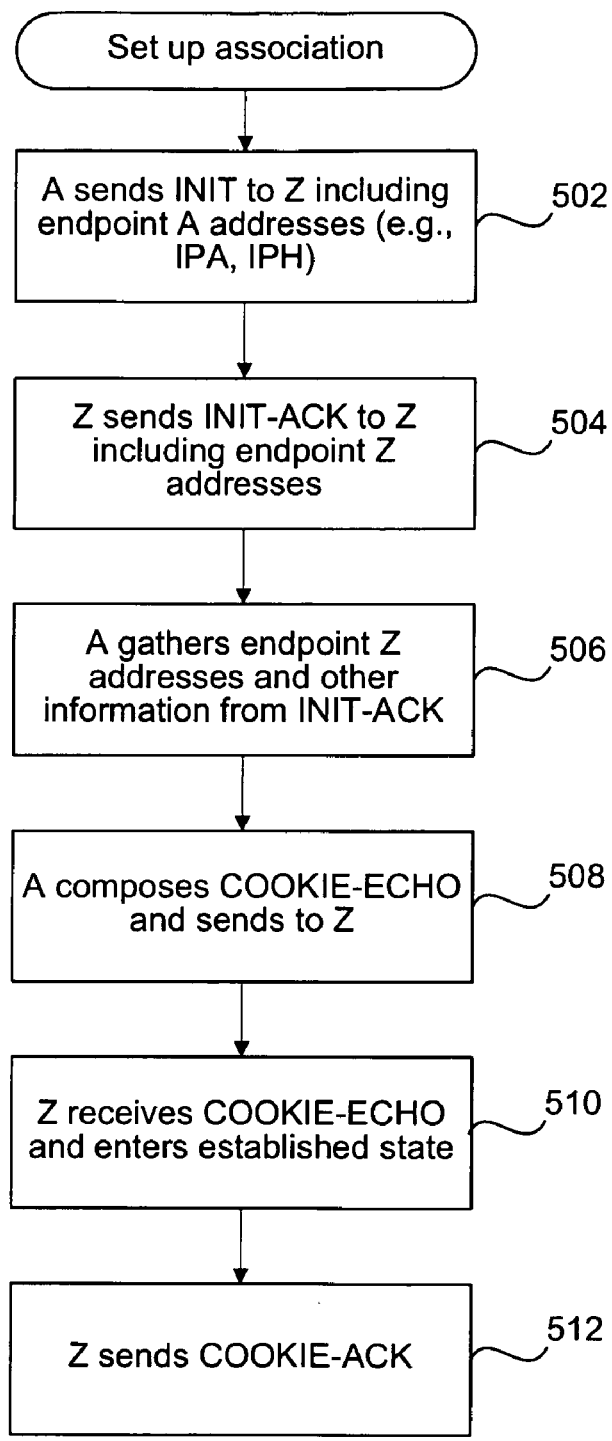
FIG. 5 is a process flow diagram illustrating a conventional method of setting up an SCTP association.
Figure 6:
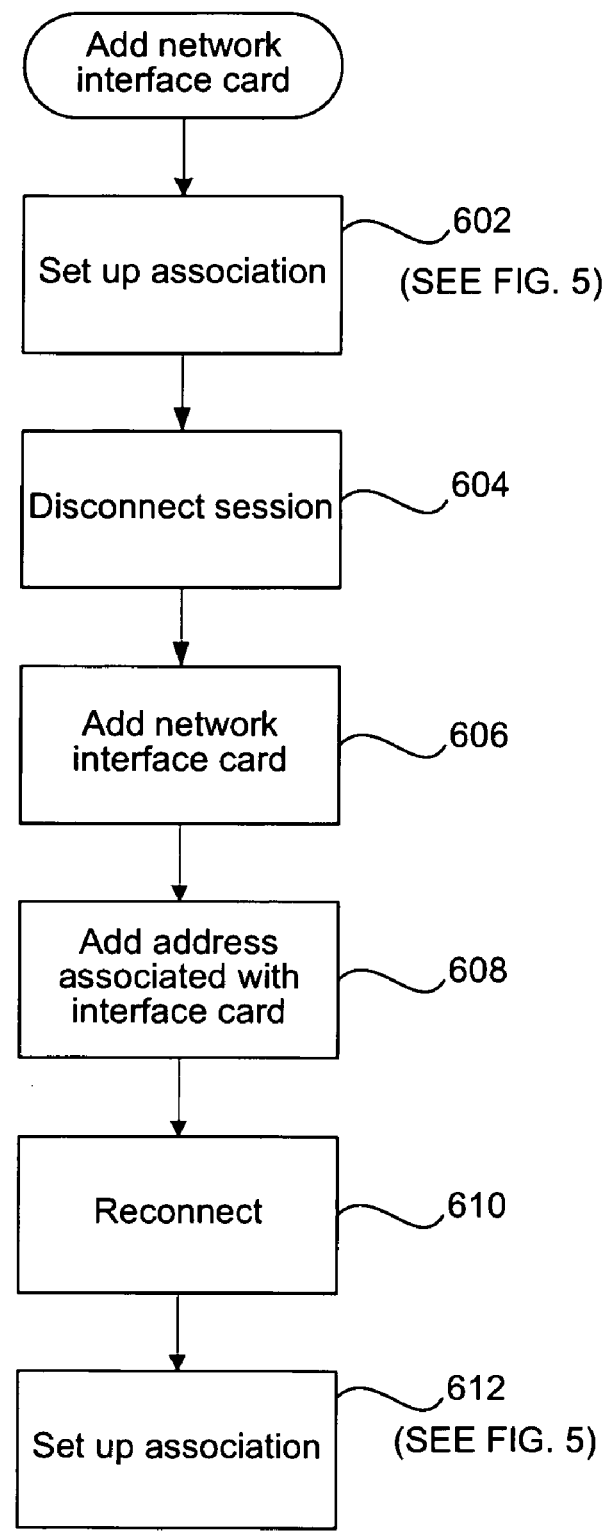
FIG. 6 is a process flow diagram illustrating a conventional method of adding a network interface card to a device.
Figure 7:
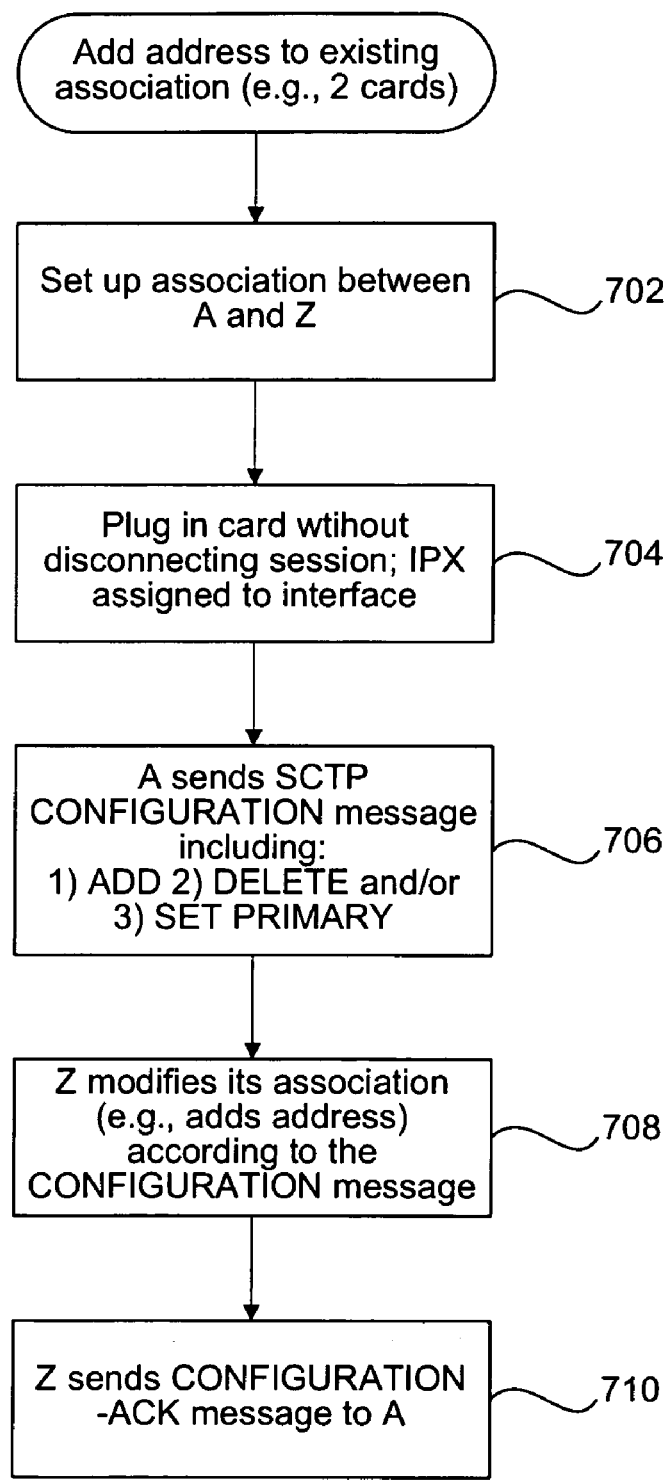
FIG. 7 is a process flow diagram illustrating a method of adding an IP address to an existing association in accordance with an embodiment of the invention.

FIG. 7 is a process flow diagram illustrating a method of adding an IP address to an existing association in accordance with an embodiment of the invention. As shown at block 702 an SCTP association is established between a first network device A and a second network device Z. As described above, an SCTP association typically includes endpoint addresses associated with both endpoints. In this example, the SCTP association includes a first set of IP addresses associated with the first network device A and a second set of IP addresses associated with the second network device Z. Once established, it may be desirable to modify the association, such as with the assignment of a new IP address to an interface associated with an existing network interface card or with the addition of a new network interface card to the first network device A.

As shown at block 704, a new network interface card is plugged into the first network device A, where IP address X is assigned to an interface of the network interface card. It is important to note that this is accomplished without disconnecting an existing session. An SCTP configuration message is then sent from the first network device A to the second network device Z at block 706, where the configuration message indicates a modification to be made to the SCTP association, thereby enabling the SCTP association to be modified without disconnecting an existing session. More particularly, the SCTP configuration message includes at least one of an ADD message indicating that a first IP address is to be added to the first set of IP addresses, a SET PRIMARY message indicating that a second IP address is to be established as a primary address in the first set of IP addresses via which to send and receive messages, and a REMOVE message indicating that a third IP address is to be removed from the first set of IP addresses in the SCTP association. Thus, one or more ADD, SET PRIMARY, and/or REMOVE messages may be supplied in the SCTP configuration message. In other words, the SCTP configuration message need not include all three messages (e.g., ADD, SET PRIMARY, and REMOVE). In this example, an ADD message indicates that the IP address X is to be added to the first set of IP addresses. The second network device Z may then send packets to the IP address X or other addresses in the first set of IP addresses of the association. However, it may also be desirable to set a primary address. For instance, it may be desirable to establish the newly added IP address as the primary IP address. In other words, the first address of the ADD message may be the second address of the SET PRIMARY message. It should be noted that an address cannot be selected as a primary address until it is added. Thus, the order in which such commands are executed is pertinent to the manner in which the IP addresses are utilized. As a result, an order may be specified for performing at least one of the ADD message, the PRIMARY message, and the REMOVE message. This order may be implicit within the SCTP configuration message, or may be explicit through a sequence number or other indicator.

The second network device Z then modifies its association as specified in the received CONFIGURATION message at block 708. More particularly, Z may add an IP address to the association, establish an IP address in the association as the "primary" IP address, and/or remove an IP address from the association. Z then sends a CONFIGURATION-ACK message to A at block 710. The SCTP acknowledgement message may acknowledge receipt of the SCTP configuration message, as well as acknowledge that the SCTP association has been modified corresponding to the SCTP configuration message.

Figure 8:
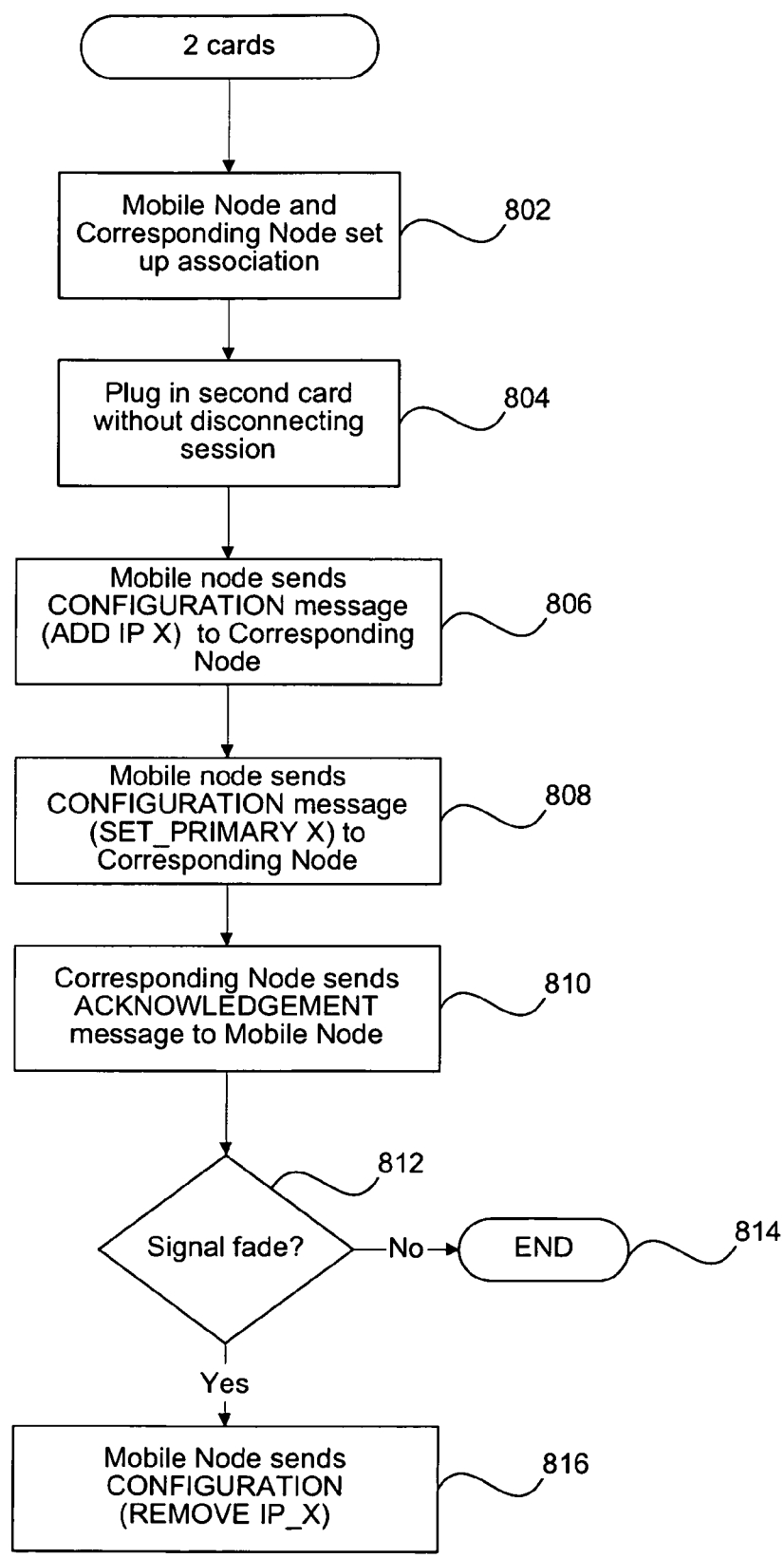
FIG. 8 is a process flow diagram illustrating a method of adding an IP address to an existing association associated with a Mobile Node in a Mobile IP environment in accordance with one embodiment of the invention.

Additionally, it may be desirable to modify an existing association associated with a Mobile Node. For instance, an association associated with one of two or more network cards may be modified. FIG. 8 is a process flow diagram illustrating a method of adding an IP address to an existing association associated with a Mobile Node in a Mobile IP environment in accordance with one embodiment of the invention. In this example, an IP address is added in association with a new (e.g., second) network card. First, a Mobile Node and Correspondent Node set up an association at block 802. A second network card is then connected at block 804. When an address (e.g., IP X) is obtained (e.g., from a provider), this new address may be added to the association. Thus, at block 806 the Mobile Node sends a CONFIGURATION message (ADD IP X) to Correspondent Node to add the new address to the association. The Correspondent Node may then send messages to the Mobile Node via any IP addresses in the association.

It may be desirable to specify a primary address or remove an address from the association depending upon the signal provided in association with a particular IP address. Thus, the Mobile Node sends a CONFIGURATION message such as SET_PRIMARY IP_X at block 808 to the Correspondent Node when the Mobile Node determines that the specified IP address (e.g., X) provides a better signal than the first set of IP addresses that were previously in the SCTP association. The Correspondent Node preferably sends an ACKNOWLEDGEMENT message to the Mobile Node at block 810 such as that described above. Rather than detecting a strong signal, the Mobile Node may also detect that a particular signal has faded at block 812. If such signal fading is not detected, the process ends at block 814. Otherwise, if signal fading is detected, the Mobile Node sends a CONFIGURATION message such as REMOVE IP_X at block 816. In this manner, an IP address may be removed from an association when it is detected that the IP address does not provide an adequate signal.

Figure 9:
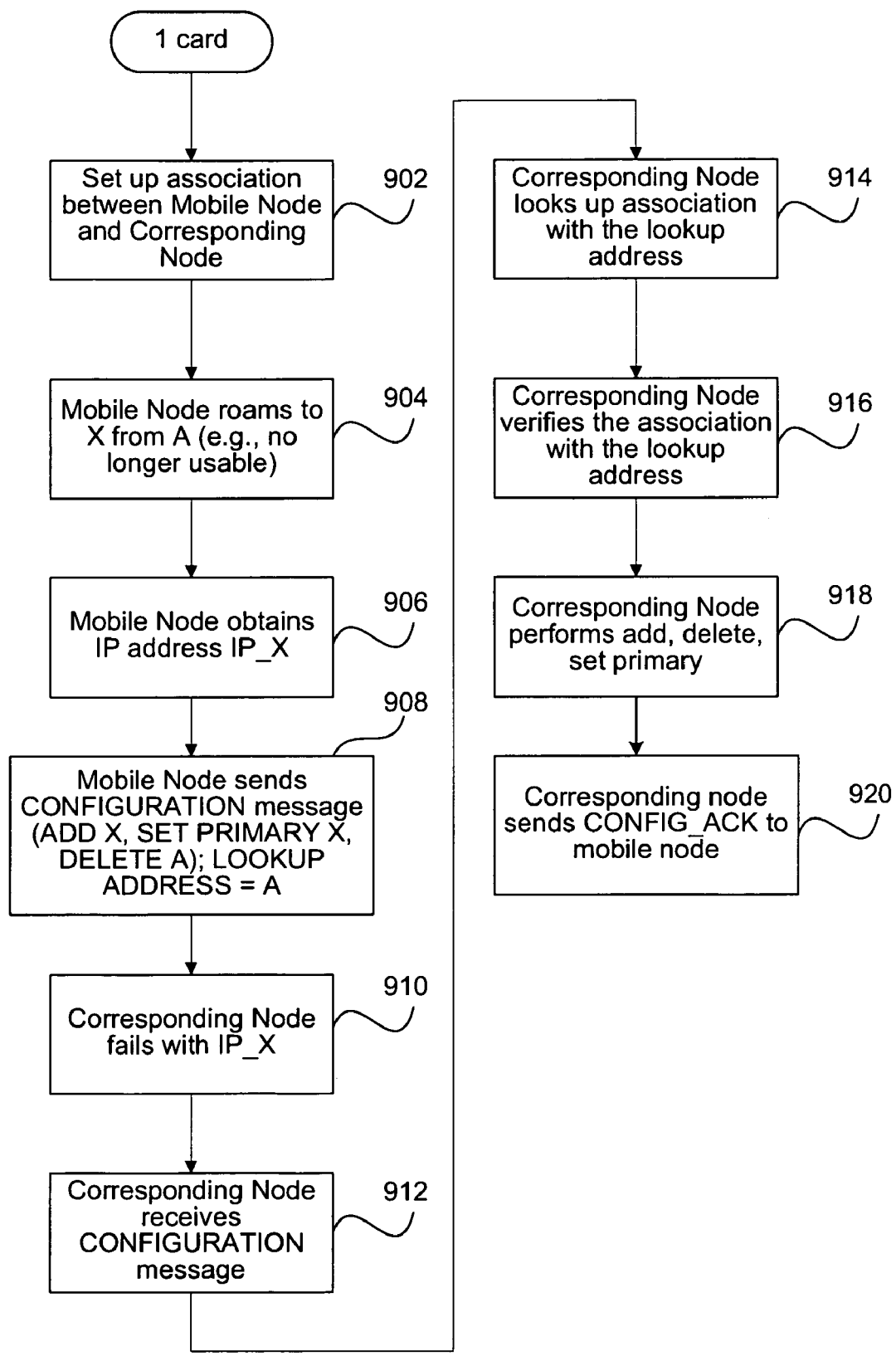
FIG. 9 is a process flow diagram illustrating a method of modifying an existing association associated with a Mobile Node roaming within a network in a Mobile IP environment in accordance with another embodiment of the invention.

When a Mobile Node roams to a new network location, it may be desirable to modify an existing association. FIG. 9 is a process flow diagram illustrating a method of modifying an existing association associated with a Mobile Node roaming within a network in a Mobile IP environment in accordance with another embodiment of the invention. The Mobile Node may have a single network card as well as multiple network cards. As shown at block 902 an association is established between the Mobile Node and a Correspondent Node. The Mobile Node then roams to IP address X (i.e., IP_X) from IP address A at block 904. For instance, the IP address A may be an address associated with a particular foreign network, which is no longer usable. Alternatively, IP address A may be a Home Address associated with the Mobile Node. The Mobile Node obtains a new IP address (e.g., IP_X) associated with its new network location at block 906. The Mobile Node then sends a CONFIGURATION message to the Correspondent Node at block 908. For instance, the CONFIGURATION message includes an ADD message to add X to the first set of addresses in the association, a SET PRIMARY message selecting the new address X as the primary address via which the Mobile Node is to send and receive packets, and a DELETE message deleting the IP address associated with the Mobile Node's previous network location from the association. In addition, a lookup address may be provided in the CONFIGURATION message to enable the receiver of the message to obtain the association. For instance, the lookup address may be IP address A, even if IP address A is ultimately removed from the association.

Until the Correspondent Node receives the CONFIGURATION message from the Mobile Node, it may continue to send messages to IP address A. Thus, the Correspondent Node will fail with the address IP_A at block 910. When the Correspondent Node receives the CONFIGURATION message at block 912, it looks up the association with the lookup address at block 914. The Correspondent Node verifies the association with the lookup address at block 916. The Correspondent Node then modifies the association at block 918 as specified in the CONFIGURATION message. More particularly, the Correspondent Node may add an IP address to the association, delete an address from the association, or set an address as a primary address. The Correspondent Node then sends a CONFIG_ACK message to the Mobile Node at block 920.

Figure 10:
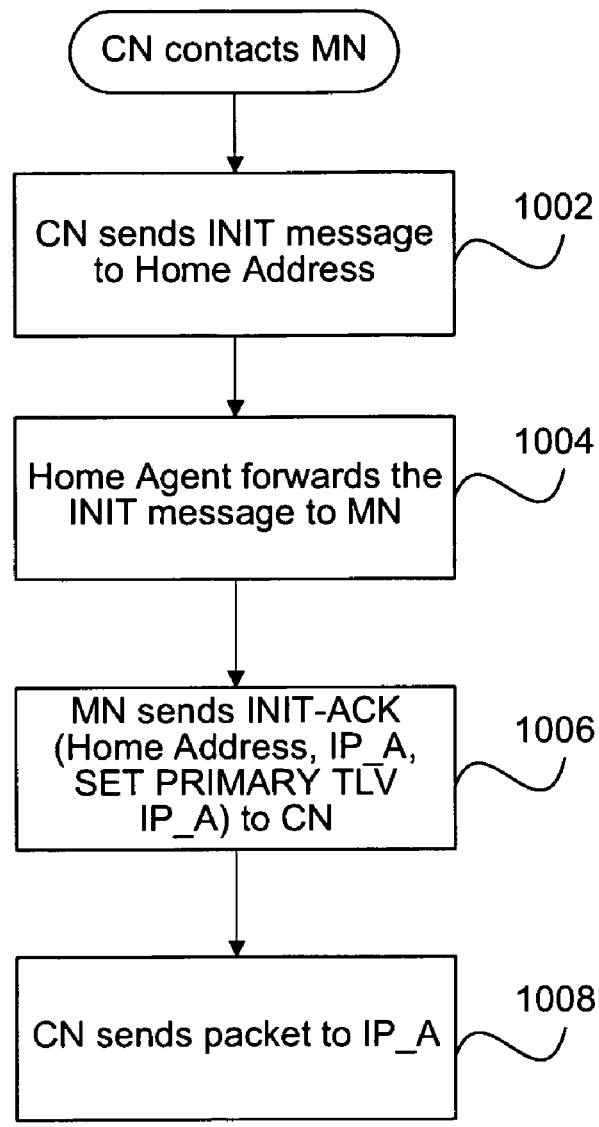
FIG. 10 is a process flow diagram illustrating a method of receiving a message by a Mobile Node from a Correspondent Node in accordance with one embodiment of the invention.

The modification of an association may be initiated by a communication from a Correspondent Node as well as by a Mobile Node. FIG. 10 is a process flow diagram illustrating a method of receiving a message by a Mobile Node from a Correspondent Node in accordance with one embodiment of the invention. In this example, the Correspondent Node sends an INIT message to a Home Address associated with the Mobile Node at block 1002. The Home Agent then forwards the INIT message to the Mobile Node at block 1004. The Mobile Node sends an INIT-ACK at block 1006. In addition, a CONFIGURATION message may be sent in the INIT-ACK message rather than separately from the INIT-ACK message. For instance, through a SET PRIMARY IP_A message, the Mobile Node may set the primary address to IP_A (rather than setting the primary address to the Home Address). This Home Address may therefore serve as a valid "secondary" address. The Correspondent Node then subsequently sends packets directly to IP_A at block 1008.

Through sending a configuration message, a request for modification to an SCTP association may be transmitted. Once the configuration message is received, the association may be modified. The receipt of the configuration message, as well as modification of the association in response to the configuration message, may be acknowledged through the sending of an acknowledgement message. For instance, the acknowledgement message may be an SCTP packet including a chunk having a chunk type associated with the SCTP acknowledgement message and a chunk value that may indicate whether the SCTP configuration message was received and processed or rejected.

As indicated above, in accordance with one embodiment, an SCTP configuration message includes an SCTP packet including one or more chunks, each chunk having a chunk type associated with the SCTP configuration message (e.g., ADD, REMOVE, SET_PRIMARY). In this manner, one or more operations to be consecutively performed (e.g., ADD, REMOVE, and/or SET_PRIMARY) may be designated. Thus, an SCTP configuration message may be generated through including one or more chunks in an SCTP packet. Of course, it is also possible that the SCTP configuration message could include multiple SCTP packets.

In accordance with a preferred embodiment, a chunk including an SCTP configuration message is provided in an SCTP packet. The chunk comprises a chunk type associated with the SCTP configuration message. For instance, the chunk type may indicate that the message is an SCTP configuration message and/or further indicate that the message is directed to an ADD, REMOVE, and/or SET_PRIMARY operation. In addition, the chunk comprises one or more parameters, each of the parameters having a value and an associated parameter type selected from the group consisting of ADD indicating that an IP address as indicated by the value is to be added to the first set of IP addresses, REMOVE indicating that the IP address is to be removed from the first set of IP addresses, and SET PRIMARY indicating that the IP address is to be established as a primary address via which the first network device is to send and receive messages.

Other Embodiments

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Home Agents of this invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 11:
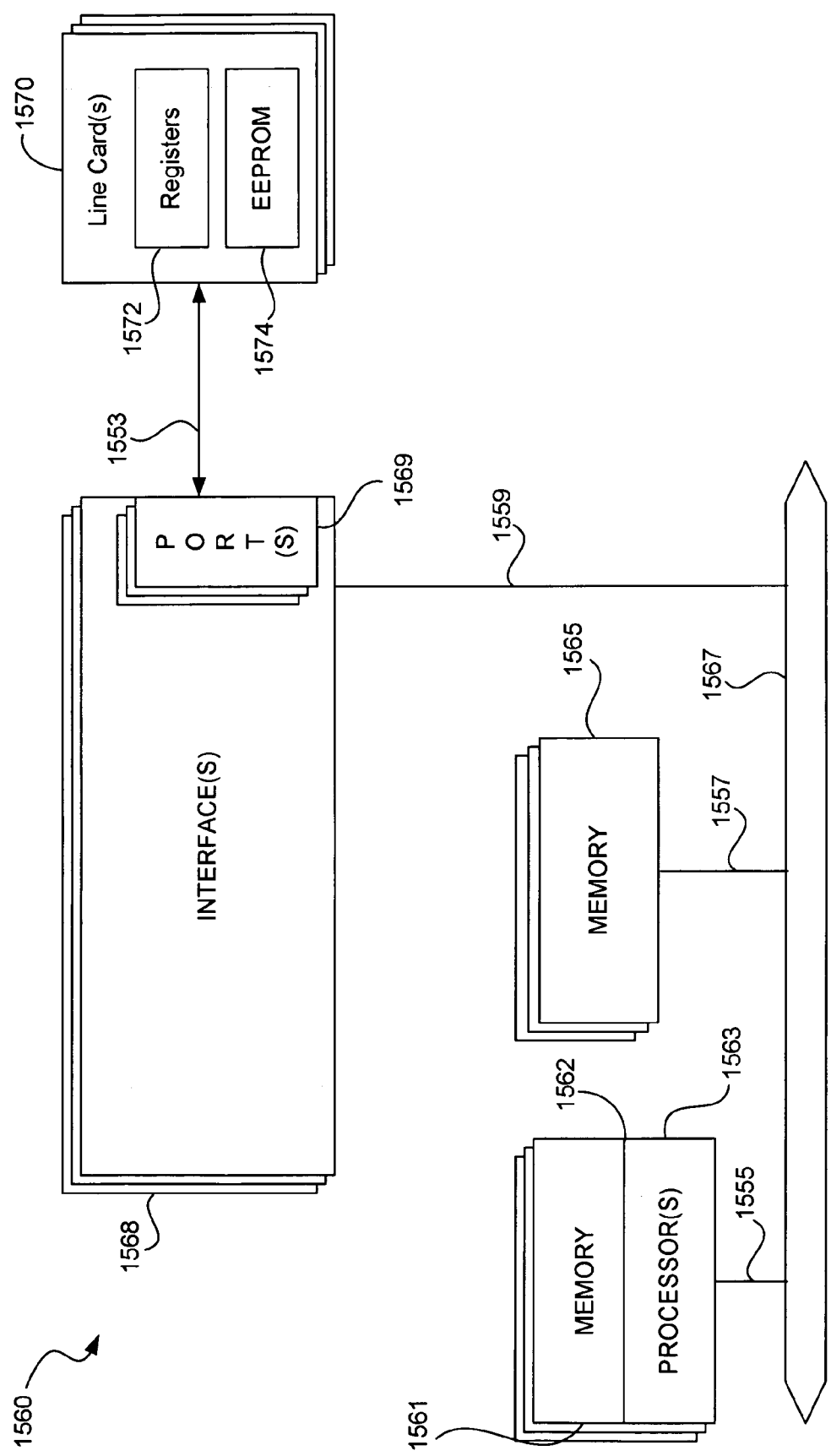
FIG. 11 is a diagram illustrating an exemplary network device in which embodiments of the invention may be implemented.

Referring now to FIG. 11, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, radio interfaces such as those defined in the 802.11 family of specifications and General Packet Radio Services (GPRS), and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. However, it should be understood that the invention is not limited to such implementations, but instead would equally apply regardless of the context and system in which it is implemented. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. In a first network device, a method of modifying a Stream Control Transmission Protocol (SCTP) association between the first network device and a second network device, the SCTP association including a first set of IP addresses associated with the first network device and a second set of IP addresses associated with the second network device, the method comprising:
   establishing the SCTP association between the first network device and the second network device;
   sending an SCTP configuration message from the first network device to the second network device, the configuration message indicating a modification to be made to the SCTP association, thereby enabling the SCTP association to be modified without disconnecting an existing session; and
   receiving an SCTP acknowledgement message from the second network device acknowledging receipt of the SCTP configuration message,
wherein the SCTP acknowledgement message comprises an SCTP packet including a chunk having a chunk type indicating that the chunk includes an SCTP acknowledgement message.

2. The method as recited in claim 1, wherein sending the SCTP configuration message from the first network device to the second network device is performed when a new IP address is assigned to the first network device.

3. The method as recited in claim 1, wherein sending the SCTP configuration message from the first network device to the second network device is performed when a new network interface card is added to the first network device.

4. The method as recited in claim 1, wherein the SCTP acknowledgement message further acknowledges that the SCTP association has been modified corresponding to the SCTP configuration message.

5. The method as recited in claim 1, wherein the first network device is a Mobile Node supporting Mobile IP.

6. The method as recited in claim 1, wherein the SCTP configuration message indicates that a specified IP address is to be added to the first set of IP addresses in the SCTP association.

7. The method as recited in claim 1, wherein the SCTP configuration message indicates that a specified IP address is to be established as a primary address in the first set of IP addresses in the SCTP association via which to send and receive messages.

8. The method as recited in claim 7, wherein sending the SCTP configuration message from the first network device to the second network device is performed when the first network device determines that the specified IP address provides a better signal than the first set of IP addresses that were previously in the SCTP association.

9. The method as recited in claim 7, wherein the first network device is a Mobile Node, and wherein the specified IP address is an IP address of a network location to which the Mobile Node has roamed.

10. The method as recited in claim 1, wherein the SCTP configuration message indicates that a specified IP address is to be removed from the first set of IP addresses in the SCTP association.

11. The method as recited in claim 10, wherein sending the SCTP configuration message from the first network device to the second network device is performed when the first network device determines that the specified IP address does not provide an adequate signal.

12. The method as recited in claim 10, wherein the first network device is a Mobile Node, and wherein the specified IP address is an IP address of a network location associated with a prior network location of the Mobile Node.

13. The method as recited in claim 1, wherein the SCTP configuration message includes at least one of an ADD message indicating that a first IP address is to be added to the first set of IP addresses, a SET PRIMARY message indicating that a second IP address is to be established as a primary address in the first set of IP addresses via which to send and receive messages, and a REMOVE message indicating that a third IP address is to be removed from the first set of IP addresses in the SCTP association.

14. The method as recited in claim 13, wherein the first address is the second address.

15. The method as recited in claim 13, wherein an order is specified for performing at least one of the ADD message, the PRIMARY message, and the REMOVE message.

16. The method as recited in claim 1, wherein the first network device is a Mobile Node, the method further comprising:
roaming to a network location;
obtaining a new IP address associated with the new network location;
wherein the SCTP configuration message indicates that the new IP address is to be added to the first set of IP addresses.

17. The method as recited in claim 16, wherein the SCTP configuration message further indicates that one of the IP addresses in the first set of IP addresses is to be removed from the first set of IP addresses.

18. The method as recited in claim 17, wherein the one of the IP addresses to be removed from the first set of IP addresses is a Home Address associated with the Mobile Node.

19. The method as recited in claim 16, wherein the SCTP configuration message further indicates that the new IP address is to be a primary address via which the Mobile Node is to send and receive packets.

20. The method as recited in claim 16, wherein the first set of IP addresses is associated with a single network interface card.

21. The method as recited in claim 1, wherein the SCTP configuration message comprises one or more SCTP packets.

22. In a first network device, a method of modifying a Stream Control Transmission Protocol (SCTP) association between the first network device and a second network device, the SCTP association including a first set of IP addresses associated with the first network device and a second set of IP addresses associated with the second network device, the method comprising:
establishing the SCTP association between the first network device and the second network device;
sending an SCTP configuration message from the first network device to the second network device, the configuration message indicating a modification to be made to the SCTP association, thereby enabling the SCTP association to be modified without disconnecting an existing session; and
appending a chunk to an SCTP packet, the chunk including the SCTP configuration message,
wherein the chunk comprises a chunk type indicating that the chunk includes an SCTP configuration message.

23. The method as recited in claim 22, wherein the chunk comprises one or more parameters, each of the parameters having a value and an associated parameter type selected from the group consisting of ADD indicating that an IP address indicated by the value is to be added to the first set of IP addresses, REMOVE indicating that the IP address is to be removed from the first set of IP addresses, and SET PRIMARY indicating that the IP address is to be established as a primary address via which the first network device is to send and receive messages.

24. In a second network device, a method of modifying a Stream Control Transmission Protocol (SCTP) association between a first network device and the second network device, the SCTP association including a first set of IP addresses associated with the first network device and a second set of IP addresses associated with the second network device, the method comprising:
establishing the SCTP association between the first network device and the second network device;
receiving an SCTP configuration message from the first network device, the configuration message indicating a modification to be made to the SCTP association, thereby enabling the SCTP association to be modified without disconnecting an existing session; and
sending an SCTP acknowledgement message from the second network device acknowledging receipt of the SCTP configuration message,
wherein the SCTP acknowledgement message comprises an SCTP packet including a chunk having a chunk type indicating that the chunk includes an SCTP acknowledgement message.

25. The method as recited in claim 24, further comprising:
modifying the SCTP association in response to the configuration message.

26. The method as recited in claim 25, wherein the SCTP configuration message indicates a lookup address associated with the SCTP association, the method further comprising:
obtaining the association.

27. The method as recited in claim 26, further comprising:
verifying the association using the lookup address.

28. The method as recited in claim 24, wherein the SCTP acknowledgement message further acknowledges that the SCTP association has been modified corresponding to the SCTP configuration message.

29. The method as recited in claim 24, wherein the first network device is a Mobile Node supporting Mobile IP.

30. The method as recited in claim 24, wherein the SCTP configuration message indicates that a specified IP address is to be added to the first set of IP addresses in the SCTP association.

31. The method as recited in claim 30, further comprising:
sending a message to one of the first set of IP addresses in the SCTP association.

32. The method as recited in claim 24, wherein the SCTP configuration message indicates that a specified IP address is to be established as a primary address in the first set of IP addresses in the SCTP association via which to send and receive messages.

33. The method as recited in claim 32, further comprising:
sending a message to the primary address in the first set of IP addresses in the SCTP association.

34. The method as recited in claim 24, wherein the SCTP configuration message indicates that a specified IP address is to be removed from the first set of IP addresses in the SCTP association.

35. The method as recited in claim 24, wherein the SCTP configuration message includes at least one of an ADD message indicating that a first IP address is to be added to the first set of IP addresses, a SET PRIMARY message indicating that a second IP address is to be established as a primary address in the first set of IP addresses via which to send and receive messages, and a REMOVE message indicating that a third IP address is to be removed from the first set of IP addresses in the SCTP association.

36. The method as recited in claim 35, wherein the first address is the second address.

37. The method as recited in claim 35, wherein an order is specified for performing at least one of the ADD message, the PRIMARY message, and the REMOVE message.

38. The method as recited in claim 24, wherein the first network device is a Mobile Node supporting Mobile IP and the second network device is a Correspondent Node.

39. The method as recited in claim 38, wherein the SCTP configuration message further indicates that one of the IP addresses in the first set of IP addresses is to be removed from the first set of IP addresses.

40. The method as recited in claim 39, wherein the one of the IP addresses to be removed from the first set of IP addresses is a Home Address associated with the Mobile Node.

41. The method as recited in claim 38, wherein the SCTP configuration message further indicates that the new IP address is to be a primary address via which the Mobile Node is to send and receive packets.

42. The method as recited in claim 24, wherein the SCTP configuration message comprises one or more SCTP packets.

43. In a second network device, a method of modifying a Stream Control Transmission Protocol (SCTP) association between a first network device and the second network device, the SCTP association including a first set of IP addresses associated with the first network device and a second set of IP addresses associated with the second network device, the method comprising:
  establishing the SCTP association between the first network device and the second network device; and
  receiving an SCTP configuration message from the first network device, the configuration message indicating a modification to be made to the SCTP association, thereby enabling the SCTP association to be modified without disconnecting an existing session, wherein the SCTP configuration message comprises an SCTP packet including a chunk and
wherein the chunk comprises a chunk type indicating that the chunk includes an SCTP configuration message.

44. The method as recited in claim 43, wherein the chunk comprises one or more parameters, each of the parameters having a value and an associated parameter type selected from the group consisting of ADD indicating that an IP address indicated by the value is to be added to the first set of IP addresses, REMOVE indicating that the IP address is to be removed from the first set of IP addresses, and SET PRIMARY indicating that the IP address is to be established as a primary address via which the first network device is to send and receive messages.

45. A first network device adapted for modifying a Stream Control Transmission Protocol (SCTP) association between the first network device and a second network device, the SCTP association including a first set of IP addresses associated with the first network device and a second set of IP addresses associated with the second network device, comprising:
  means for establishing the SCTP association between the first network device and the second network device;
  means for sending an SCTP configuration message from the first network device to the second network device, the configuration message indicating a modification to be made to the SCTP association, thereby enabling the SCTP association to be modified without disconnecting an existing session; and
  means for receiving an SCTP acknowledgement message from the second network device acknowledging receipt of the SCTP configuration message, wherein the SCTP acknowledgement message comprises an SCTP packet including a chunk having a chunk type indicating that the chunk includes an SCTP acknowledgement message.

46. A first network device adapted for modifying a Stream Control Transmission Protocol (SCTP) association between the first network device and a second network device, the SCTP association including a first set of IP addresses associated with the first network device and a second set of IP addresses associated with the second network device, comprising:
  a processor; and
  a memory, at least one of the processor and the memory being adapted for:
  establishing the SCTP association between the first network device and the second network device;
  sending an SCTP configuration message from the first network device to the second network device, the configuration message indicating a modification to be made to the SCTP association, thereby enabling the SCTP association to be modified without disconnecting an existing session; and
  receiving an SCTP acknowledgement message from the second network device acknowledging receipt of the SCTP configuration message, wherein the SCTP acknowledgement message comprises an SCTP packet including a chunk having a chunk type indicating that the chunk includes an SCTP acknowledgement message.

47. A computer-readable medium storing thereon computer-readable instructions for modifying a Stream Control Transmission Protocol (SCTP) association between the first network device and a second network device, the SCTP association including a first set of IP addresses associated with the first network device and a second set of IP addresses associated with the second network device, comprising:
  instructions for establishing the SCTP association between the first network device and the second network device;
  instructions for sending an SCTP configuration message from the first network device to the second network device, the configuration message indicating a modification to be made to the SCTP association, thereby enabling the SCTP association to be modified without disconnecting an existing session; and
  instructions for receiving an SCTP acknowledgement message from the second network device acknowledging receipt of the SCTP configuration message, wherein the SCTP acknowledgement message comprises an SCTP packet including a chunk having a chunk type indicating that the chunk includes an SCTP acknowledgement message.

48. A second network device adapted for modifying a Stream Control Transmission Protocol (SCTP) association between a first network device and the second network device, the SCTP association including a first set of IP addresses associated with the first network device and a second set of IP addresses associated with the second network device, comprising:

means for establishing the SCTP association between the first network device and the second network device; and means for receiving an SCTP configuration message from the first network device, the configuration message indicating a modification to be made to the SCTP association, thereby enabling the SCTP association to be modified without disconnecting an existing session, wherein the SCTP configuration message comprises an SCTP packet including a chunk and wherein the chunk comprises a chunk type indicating that the chunk includes an SCTP configuration message.

49. A second device adapted for modifying a Stream Control Transmission Protocol (SCTP) association between a first network device and the second network device, the SCTP association including a first set of IP addresses associated with the first network device and a second set of IP addresses associated with the second network device, comprising:

a processor; and a memory, at least one of the processor and the memory being adapted for:

establishing the SCTP association between the first network device and the second network device; and receiving an SCTP configuration message from the first network device, the configuration message indicating a modification to be made to the SCTP association, thereby enabling the SCTP association to be modified without disconnecting an existing session, wherein the SCTP configuration message comprises an SCTP packet including a chunk and wherein the chunk comprises a chunk type indicating that the chunk includes an SCTP configuration message.

50. A computer-readable medium storing thereon computer-readable instructions for modifying a Stream Control Transmission Protocol (SCTP) association between a first network device and the second network device, the SCTP association including a first set of IP addresses associated with the first network device and a second set of IP addresses associated with the second network device, comprising:

instructions for establishing the SCTP association between the first network device and the second network device; and instructions for receiving an SCTP configuration message from the first network device, the configuration message indicating a modification to be made to the SCTP association, thereby enabling the SCTP association to be modified without disconnecting an existing session, wherein the SCTP configuration message comprises an SCTP packet including a chunk and wherein the chunk comprises a chunk type indicating that the chunk includes an SCTP configuration message.

51. A first network device adapted for modifying a Stream Control Transmission Protocol (SCTP) association between the first network device and a second network device, the SCTP association including a first set of IP addresses associated with the first network device and a second set of IP addresses associated with the second network device, comprising:

a processor; and a memory, at least one of the processor and the memory being adapted for:

establishing the SCTP association between the first network device and the second network device;

sending an SCTP configuration message from the first network device to the second network device, the configuration message indicating a modification to be made to the SCTP association, thereby enabling the SCTP association to be modified without disconnecting an existing session; and appending a chunk to an SCTP packet, the chunk including the SCTP configuration message, wherein the chunk comprises a chunk type indicating that the chunk includes an SCTP configuration message.

52. A second network device adapted for modifying a Stream Control Transmission Protocol (SCTP) association between a first network device and the second network device, the SCTP association including a first set of IP addresses associated with the first network device and a second set of IP addresses associated with the second network device, comprising:

a processor; and a memory, at least one of the processor and the memory being adapted for:

establishing the SCTP association between the first network device and the second network device;

receiving an SCTP configuration message from the first network device, the configuration message indicating a modification to be made to the SCTP association, thereby enabling the SCTP association to be modified without disconnecting an existing session; and sending an SCTP acknowledgement message from the second network device acknowledging receipt of the SCTP configuration message, wherein the SCTP acknowledgement message comprises an SCTP packet including a chunk having a chunk type indicating that the chunk includes an SCTP acknowledgement message.

* * * * *